3,228,943
LUMILYSERGOL DERIVATIVES
Luigi Bernardi, Milan, Germano Bosisio, Palazzolo
 Milanese, and Onofrio Goffredo, Milan, Italy, assignors
 to Società Farmaceutici Italia, Milan, Italy, a corporation of Italy
No Drawing. Filed June 4, 1963, Ser. No. 285,229
Claims priority, application Italy, June 11, 1962,
11,670/62
17 Claims. (Cl. 260—285.5)

Our invention relates to lumilysergol, 1-methyl-lumilysergol and certain of their ester and ether derivatives which are useful in therapy, and to a process for their preparation.

The compounds of the invention have the formula:

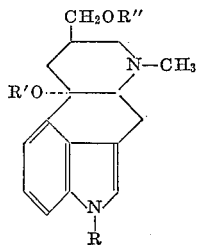

wherein:

R is a hydrogen atom or methyl radical,
R' is a hydrogen atom or a lower alkyl radical, and
R'' is a hydrogen atom or a radical of an aliphatic, cycloaliphatic, aromatic or heterocyclic carboxylic or sulphonic acid having from 1 to 10 carbon atoms, substituted or not by halogen atoms, free or alkylated amino, nitro, hydroxy, alkyl, alkoxy, thioether or sulphonic groups.

The process of the invention comprises reducing lumilysergic acid, 1-methyl-lumilysergic acid or a corresponding 8-ester-10-ether derivative thereof, to yield lumilysergol, 1-methyl-lumilysergol or the appropriate 10-ether-derivative and where necessary esterifying to yield the corresponding acyl derivative.

The process of the invention is illustrated by the reaction scheme:

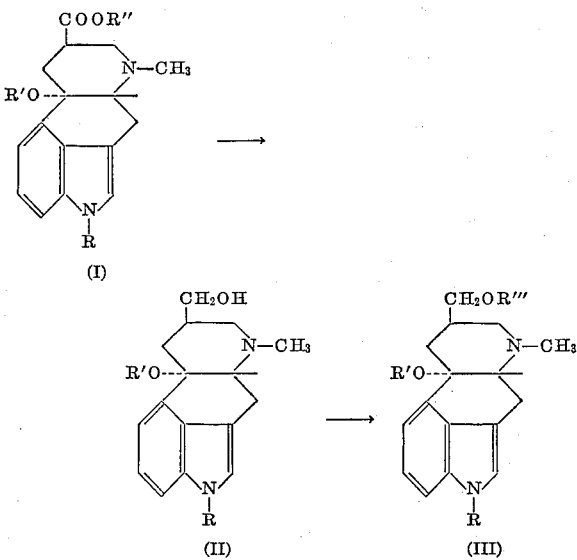

wherein:

R is a hydrogen atom or a methyl group,
R'=R''=a hydrogen atom or a lower alkyl group, and
R''' is acyl.

Lumilysergic and 1-methyl-lumilysergic acid, the starting materials for the process of the invention, may be prepared by U.V. irradiation of the corresponding acid dissolved in a dilute mineral acid, preferably dilute hydrochloric acid. The methylation of the 1-nitrogen atom of the ergoline ring may be effected before or after the U.V. irradiation by reacting with a methyl halide, preferably methyl iodide, in liquid ammonia in the presence of metallic potassium.

The transformation of the carboxyl group in the 8-position of the ergoline into a primary alcohol group is preferably carired out with the carboxyl group protected, an ester or mixed anhydride being treated. Examples of suitable esters are methyl and ethyl esters and the preferred mixed anhydride is that obtained by reacting with an alkyl chlorocarbonate.

The 8-ester-10-ether derivatives of lumilysergic or 1-methyl-lumilysergic acid, being the starting materials for the preparation of 10-ether derivatives of lumilysergol or 1-methyl-lumilysergol, may be prepared from lumilysergic or 1-methyl-lumilysergic acid by simultaneous esterification in the 8-position and etherification in the 10-position by treatment in a cold solution in the alcohol, which is going to provide the ester and ether groups, with anhydrous hydrogen chloride.

The reduction to the lumilysergol derivatives (Step I to II) is carried out with a reducing agent which is capable of reducing a carboxyl group into an alcohol group, such as lithium aluminum hydride. The reaction may be carried out at room temperature, but is preferably completed in the warm. It should be carried out in the presence of a solvent, stable towards the reducing agent, for example an ether, such as diethyl ether, dipropyl ether, tetrahydrofuran, ethylene glycol dimethyl ether and their analogues. Lumilysergol or 1-methyl-lumilysergol are isolated as such in crude crystalline form by concentrating the reaction mixture and subsequent cooling and they may optionally be purified by recrystallization from a solvent. The corresponding 8-acyl derivatives may be prepared (Step II to III) by reacting lumilysergol or 1-methyl-lumilysergol with an acylating agent, such as the anhydride or the chloride of the appropriate carboxylic or sulphonic acid optionally in the presence of a tertiary amine, such as pyridine, diethylaniline, or triethylamine.

Typical examples of acyl derivatives, prepared according to the invention, are the derivatives of the following acids: acetic, trimethylacetic, propionic, butyric, valerianic, hexanoic, heptanoic, octanoic, decanoic, cyclopentanecarboxylic, cyclopentylpropionic, succinic, benzoic, 2-nitro-benzoic, 3-chloro-benzoic, salicylic, toluic, 2-methoxy-benzoic, methylthiosalicylic, 2,6-dimethoxy-benzoic, 3,4,5-trimethoxy-benzoic, phenylpropionic, phenoxy-acetic, α-phenoxy-propionic, diethylcarbamic, chloroacetic, N,N-diethyl-aminoacetic, α-phenoxy-butyric, butyl-carbonic, isobutyl-carbonic, ethylcarbonic, propylcarbonic, isopropylcarbonic, N-ethyl-anthranilic, N,N-dimethyl-anthranilic, p-toluenesulphonic, methanesulphonic, pyrrole-2-carboxylic, N-pyrrolidine-acetic, nicotinic, isonicotinic, pyridine-3,5-dicarboxylic, pyridine-3-sulphonic, lutidinic, pyridine-acetic, piccolinic, pyridine-3-isobutyric, piperidine-2-carboxylic, 3- and 4-piperidine-acetic, indole-3-acetic, imidazole-4-acetic, pyrazinoic, piperazine-1-acetic, piperazine-2 - dimethylaminoethyl - 1 - carboxylic, pyrimidine-4-carboxylic, pyrimidine-5-bromo-2-carboxylic, pyrimidine-5-amino-2-methyl-4-carboxylic, furan-3-methyl-2-carboxylic, furan-2-carboxylic, pyran-2,6-dicarboxylic, thiophene-3-carboxylic, thiophene-2,4-disulphonic, isooxazole-3-carboxylic, isooxazole-5-amino-3-methyl-4-carboxylic, N-morpholino-acetic, thiomorpholino-3,5-dicarboxylic, thiazole-2-carboxylic, thiazole-4-methyl-2-carboxylic, thiazole-2-amino-4-carboxylic, thiazole-2-hydroxy-4-carboxylic, thiazole-2-acetic and their analogues.

The products of the invention are crystalline, colorless or yellowish solids. They show a good oxytocic, antienteraminic, adrenolytic, hypotensive and sedative activity and low toxicity. The therapeutic compositions, usually employed, include one or more compounds of the invention with a certain amount of therapeutically acceptable solid or liquid vehicle. The compositions can be prepared as tablets, powders, pills and other forms suitable for oral administration. Liquid diluents, properly sterilized, are employed for parenteral administration. Excipients can be employed, among which the most suitable are: starch, lactose, talc and/or magnesium stearate. Tablets can be prepared with substances normally employed or the compositions may be filled in capsules and containers normally used, such as gelatin capsules.

The following examples are to illustrate, but not to limit, the invention:

Example 1.—Lumilysergol

To a mixture of 550 cc. of anhydrous tetrahydrofuran and 18 cc. of triethylamine, 12 g. of lumilysergic acid are added and 15 cc. of isobutyl chloroformate are dropwise added with stirring at room temperature. The mixture is stirred overnight at room temperature so that the acid is protected by the formation of a mixed anhydride with the chloroformate. The unreacted lumilysergic acid is filtered off and the filtrate is added dropwise to a suspension of 24 g. of lithium aluminum hydride in 1400 cc. of anhydrous tetrahydrofuran at 55° C. and then refluxed (63° C.) for 2 hours. After cooling, aqueous tetrahydrofuran is added to the mixture to destroy the excess reducing agent, thereafter the product is filtered. After distilling off the tetrahydrofuran, a yellow residue (9.5 g.) remains, which is pulped in warm chloroform. 6.8 g. of lumilysergol, melting at 275–277° C. (with decomposition) $[\alpha]_D^{20} = +16°$ (c.=0.42 in pyridine), are obtained.

Example 2.—1-methyl-lumilysergol

The preparation is carried out as in Example 1, but employing 1-methyl-lumilysergic acid in lieu of lumilysergic acid and 1-methyl-lumilysergol, melting at 225–226° C. (with decomposition) $[\alpha]_D^{20} = +15°$ (c.=0.45 in pyridine), is obtained.

Example 3.—Lumilysergol-8-benzoate 1 cc. of benzoyl chloride is added to 0.410 g. of lumilysergol in 15 cc. of anhydrous pyridine and the solution is stirred for 30 minutes at room temperature. 1 cc. of water is added, the mixture stirred for 10 minutes, and then evaporated in vacuo to dryness. The greenish oily residue is dissolved in chloroform, washed first with dilute aqueous caustic soda, then with sodium bicarbonate solution and finally with water. The resulting solution is dried over anhydrous sodium sulphate, and evaporated in vacuo to dryness. The residual yellow-brownish foam is finally dissolved in warm acetone, decolorized with charcoal and concentrated to small volume. By cautiously adding petroleum ether, 0.520 g. of lumilysergol-8-benzoate, melting at 151–153° C. is recrystallized. $[\alpha]_D^{20} = +10°$ (c.=0.3 in pyridine).

Example 4.—Lumilysergol-8-acetate

The preparation is carried out in the same way as in Example 3, but employing acetic anhydride. Lumilysergol-8-acetate, melting at 95–97° C., is obtained. $[\alpha]_D^{20} = +19°$ (c.=0.4 in pyridine).

Example 5.—Lumilysergol-8-nicotinate

The preparation is carried out in the same way as in Example 3, but employing nicotinic acid chloride. Lumilysergol-8-nicotinate, melting at 120–123° C., is obtained. $[\alpha]_D^{20} = +17°$ (c.=0.6 in pyridine).

Example 6.—Acylates of 1-methyl-lumilysergol

In the same way as described for lumilysergol, the 8-acetate, 8-nicotinate and 8-benzoate of 1-methyl-lumilysergol, all amorphous, are prepared.

1-methyl-lumilysergol-8-acetate $[\alpha]_D^{20} = +16°$ (c.=0.2 in pyridine)

1-methyl-lumilysergol-8-benzoate $[\alpha]_D^{20} = +13°$ (c.=0.36 in pyridine)

1-methyl-lumilysergol-8-nicotinate $[\alpha]_D^{20} = +15°$ (c.=0.4 in pyridine)

Example 7.—Lumilysergic acid-8-methylester-10-methylether

Into a suspension of 10 g. of lumilysergic acid in 600 cc. of absolute methanol a stream of anhydrous hydrogen chloride is bubbled for 1.5 hours with strong cooling. The stream of hydrogen chloride is stopped and the mixture is allowed to stand for 30 minutes at 0° C., and is evaporated in vacuo to dryness. The residue is taken up with ice-cooled water made alkaline with concentrated ammonia and extracted with chloroform. The combined chloroform extracts are washed first with a 5% aqueous solution of sodium bicarbonate, then with water, and are thereafter dried over anhydrous sodium sulphate and finally evaporated in vacuo to dryness. The residue, recrystallized from ether, yields 8.97 g. of product, melting at 181–183° C.; $[\alpha]_D^{20} = 0°$ (c.=0.47 in pyridine).

By operating in the same way but starting from 1-methyl-lumilysergic acid, 1-methyl-lumilysergic acid-8-methylester-10-methylether is obtained.

By replacing methanol with other lower aliphatic alcohols, such as ethanol, n-propanol or n-butanol, the corresponding 8-ester-10-ether derivatives may be obtained.

Example 8.—Lumilysergol-10-methylether

To a boiling suspension of 2 g. of lithium aluminum hydride in 50 cc. of anhydrous tetrahydrofuran, a solution of 1 g. of lumilysergic acid-8-methylester-10-methylether in 20 cc. of anhydrous tetrahydrofuran is added dropwise and the resulting solution is refluxed for a further 2 hours. After cooling the resulting solution, aqueous tetrahydrofuran is added to destroy the excess reducing agent and the solution is filtered. Tetrahydrofuran is distilled off and the residue is recrystallized from acetone petroleum ether. 0.615 g. of the product, melting at 225–227° C., are obtained. $[\alpha]_D^{20} = 0°$ (c.=0.6 in pyridine).

By operating in the same way, but starting from 1-methyl-lumilysergic acid-8-methylester-10-methylether, 1-methyl-lumilysergol-10-methylether is obtained, melting at 212–214° C.; $[\alpha]_D^{20} = -20°$ (c.=0.6 in pyridine).

Example 9.—Lumilysergol-8-benzoate-10-methylether

To a solution of 0.4 g. of lumilysergol-10-methylether in 15 cc. of anhydrous pyridine 1 cc. of benzoyl chloride is added at room temperature and the mixture is stirred for 1 hour. 1 cc. of water and 1 cc. of methanol are added and the resulting mixture is stirred for 1 hour, extracted with chloroform, and washed in sequence with 1% aqueous caustic soda, 5% aqueous sodium bicarbonate solution, and water. The resulting solution is dried over anhydrous sodium sulphate and the solvent is distilled off. By recrystallization of the residue from acetone petroleum ether, 0.390 g. of lumilysergol-8-benzoate-10-methyl-ether, melting at 199–200° C., are obtained. $[\alpha]_D^{20} = -36°$ (c.=0.3 in pyridine).

Example 10.—Lumilysergol-8-nicotinate-10-methylether

The preparation is carried out in the same way as in Example 9 but employing nicotinic acid chloride as the acylating agent. Lumilysergol-8-nicotinate-10-methylether, melting at 125–126° C., is obtained. $[\alpha]_D^{20} = -43°$ (c.=0.35 in pyridine).

Example 11.—1-methyl-lumilysergol-8-benzoate-10-methylether

The preparation is carried out in the same way as in Example 9, but employing 1 - methyl-lumilysergol - 10-methylether as the starting material and using benzoyl chloride as the acylating agent. 1-methyl-lumilysergol-8-benzoate-10-methylether, melting at 167–169° C., is obtained. $[\alpha]_D^{20} = -40°$ (c.=0.3 in pyridine).

Example 12.—1-methyl-lumilysergol-8-acetate-10-methylether

The preparation is carried out in the same way as in Example 9, but employing 1-methyl-lumilsergol-10-methylether as the starting material and using acetyl chloride as acylating agent. 1-methyl-lumilysergol-8-acetate - 10-methylether, melting at 115–117° C., is obtained. $[\alpha]_D^{20} = -10°$ (c.=0.2 in pyridine).

Example 13.—1-methyl-lumilysergol-8-nicotinate-10-methylether

The preparation is carried out in the same way as in Example 9, but employing 1-methyl-lumilysergol - 10-methylether as starting material and using nicotinoyl chloride as acylating agent. 1-methyl-lumilysergol-8 - nicotinate-10-methylether, melting at 202–203° C., is obtained. $[\alpha]_D^{20} = -12°$ (c.=0.2 in pyridine).

Example 14.—1-methyl-lumilysergol-8-(6'-methylnicotinate)-10-methylether

The preparation is carried out in the same way as in Example 13, but using 6'-methylnicotinoylchloride as acylating agent. The product melts at 144–146° C.

We claim:
1. Lumilysergol.
2. 1-methyl-lumilysergol.
3. Lumilysergol-8-acetate.
4. Lumilysergol-8-benzoate.
5. Lumilysergol-8-nicotinate.
6. 1-methyl-lumilysergol-8-benzoate.
7. 1-methyl-lumilysergol-8-nicotinate.
8. Lumilysergol-10-methylether.
9. 1-methyl-lumilysergol-10-methylether.
10. Lumilysergol-8-benzoate-10-methylether.
11. Lumilysergol-8-nicotinate-10-methylether.
12. 1-methyl-lumilysergol-8-benzoate-10-methylether.
13. 1-methyl-lumilysergol-8-acetate.
14. 1-methyl-lumilysergol-8-acetate-10-methylether.
15. 1-methyl-lumilysergol-8-nicotinate-10-methylether.
16. 1-methyl-lumilysergol-8-(6'-methylnicotinate) - 10-methylether.
17. A compound of the formula:

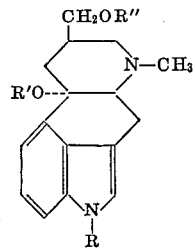

wherein:
R is selected from the group consisting of hydrogen and methyl,
R' is selected from the group consisting of hydrogen and a lower alkyl of from 1–4 carbon atoms, and
R'' is selected from the group consisting of hydrogen and organic carboxyl group of
  (a) unsubstituted saturated aliphatic acid of from 1 to 4 carbon atoms;
  (b) diethylcarbamic acid;
  (c) aromatic acid selected from the group consisting of substituted and unsubstittued benzoic acid in which the substituent is selected from the group consisting of chloro and methoxy;
  (d) heterocyclic acid selected from the group consisting of nicotinic and 6'-methylnicotinic acids.

References Cited by the Examiner

UNITED STATES PATENTS 3,155,667   11/1964   Camerino et al. ___ 260—285.5

FOREIGN PATENTS 786,138   11/1957   Great Britain.

OTHER REFERENCES

Burger: Medicinal Chemistry, 2nd ed., pp. 585–6 and 622 (1969).

Stoll et al.: Helv. Chim. Acta., vol. 32, pp. 1947–1956 (pp. 1953–4 relied on) (1949).

NICHOLAS S. RIZZO, *Primary Examiner.*

DON M. KERR, DONALD G. DAUS,
*Assistant Examiners.*